Patented Aug. 27, 1940

2,212,701

UNITED STATES PATENT OFFICE 2,212,701

PLANT SPRAY COMPOUND

Henry J. Reynolds, Sumner, Wash.

No Drawing. Application October 25, 1937,
Serial No. 170,937

1 Claim. (Cl. 167—42)

This invention relates to improvements in parasiticides and more particularly to insecticidal spraying compositions particularly adapted to the control of the greenhouse red spider, chrysanthemum midge, cyclamen mite and other insect pests.

Insecticidal, parasiticidal, and fungicidal compositions in general can be divided into those types which depend for their toxic effect upon poisons which are eaten by the insects, such as arsenical sprays and the like, and those compositions which produce physiological reactions, for example, pyrethrum, rotenone, extracts of derris, and the like. There is too another class of material useful in abating insect pests which depends for its efficacy upon its physical properties, for example, tackiness or similar qualities which prevent the insect pests from moving about on surfaces coated with said material. This type of composition, which is generally recognized and sold as so-called Tanglefoot, is sometimes used in conjunction with materials of the first-mentioned types in order to increase the efficacy of the composition.

However, none of the materials hereinbefore referred to have proved satisfactory in the control of certain insect pests notably greenhouse red spider, chrysanthemum midge, cyclamen mite, greenhouse white fly, rhododendron white fly, rhododendron lace wing, rose aphid, and the like. Failure to control these pests has been due at least in a measure to the inability of previously known compositions to destroy the eggs and larvae deposited by the insects on the foliage and also to the fact that the insecticide or parasiticide could not be applied successfully to foliage without detrimental effect upon the plant by reason of interference with transpiration. Moreover, compositions of the type of Tanglefoot which are usually applied to the trunk and bark of the tree do not substantially interfere with the activity of insects which live upon the foliage inasmuch as it is possible for them to live and complete their life cycle without leaving the foliage and thereby coming in contact with the composition. Furthermore, insecticidal compositions of the types first-referred to, when applied to the foliage of plants normally do not retain their toxic qualities for sufficient time to provide adequate control of the extremely hardy and rugged types of insect pests referred to. For example, most of the powdered materials are readily blown away by the wind and accordingly the foliage must be treated frequently if adequate pest control is to be attained. It will be evident that arsenicals and the like which depend for their toxic effect upon being eaten by the insect will be without effect upon larvae and eggs inasmuch as insects in this stage are not provided with eating apparatus as would be required.

It is among the major objects of the present invention to provide a composition particularly adapted for control of insect pests such as greenhouse red spider, chrysanthemum midge, cyclamen mite, greenhouse white fly, rhododendron white fly, rhododendron lace wing, rose aphid, and the like, and which can be sprayed upon the foliage of plants whereby the said insects are destroyed whether in the adult stage or present as larvae, and the like.

It is a further object of the present invention to provide a composition of the type referred to which, when deposited upon foliage and plants, does not materially effect the transpiration thereof and accordingly, though noxious to insect life, is innocuous to plant life.

It is another object of the present invention to provide a composition of the type referred to which is economical in cost of manufacture and which can be diluted to the requisite viscosity with water. It is a notable feature of the composition that it is instantly miscible in all proportions with water and accordingly there is no difficulty attendant upon the preparation of insecticidal sprays containing different concentrations of active ingredients.

It is an additional object of the present invention to provide a composition of the type referred to which when applied to insect infected foliage establishes an enveloping film about both foliage and insects whereby constricting and crushing effects are produced upon the insects, their ova and larvae.

It is another feature of the composition according to the present invention that it is characterized by substantially low surface tension and accordingly readily penetrates into the pores and interstices of the body of the insect, thereby disseminating itself into the eating and breathing apparatus and causing the desired effect. It is further notable that the composition according to the present invention destroys insect larvae and the like by introduction of materials into the interior of said organisms thru processes not dissimilar to osmosis. It is believed that the osmotic-like function is facilitated by the low surface tension of the composition which insures thorough wetting of the foliage and insect larvae.

It is a further feature of the composition according to the present invention that it contains a substantially deliquescent material whereby the composition after being sprayed upon the foliage remains in substantially tacky film-like condition thereby facilitating destruction of insects which may subsequently attempt to feed upon the foliage. It has been observed that the film-forming qualities of the composition interfere with the normal functions of the insect, such for instance as oviposition.

A further noteworthy feature of the composition according to the present invention that after application to the foliage to be treated, it can be removed readily therefrom merely by washing with water inasmuch as it retains its solubility and/or miscibility with water even after application to the plant.

Other objects and features of the composition according to the present invention will be apparent to those skilled in the art during the course of the following description.

Regarded in certain of its broader aspects, the present invention comprises a composition containing a major proportion of a water-miscible normally viscid aliphatic organic substance, such as glucose, and the like, along with minor proportions of materials adapted to lower the surface tension of the composition, preservatives, and such proportions of diluent as may appear desirable to use in order that the proper concentration of reactive material be obtained.

Among the water-miscible organic substances which have proven satisfactory for use compositions according to the present invention are commercial grades of glucose, extract of malt commonly known as malt syrup, glycerol and other dihydric alcohols, and like fluid normally viscid aliphatic materials. Experience indicates that it is desirable to use a substantially deliquescent substance of the mentioned type in order to prevent or at least largely minimize the likelihood of crystallization of the composition due to partial dehydration after application to the foliage. It is also believed that these qualities of the substance facilitate the preservation of a film-like protective covering over the plant surface.

Various materials have been found satisfactory for use in the composition according to the present invention as a means for reducing the surface tension thereof and assisting in wetting of the foliage and insects during and subsequent to application of the composition, however, experience indicates that the substantially neutral soaps are most satisfactory for this purpose.

Although it is not an essential constituent of the composition according to the present invention, it is preferred to include in same a preservative material such as sodium benzoate or chloroform in order to prevent deterioration of the malt extract when this particular type of organic substance is used.

In order to facilitate a more complete understanding of the matter of the present invention, a certain particular embodiment thereof is hereinafter described, but it is to be understood that it is given solely by way of example and is non-limitative.

A composition according to the present invention which experience indicates is satisfactory for the control of pests hereinbefore referred to comprises the following materials in the proportions, by weight, indicated:

| | Parts |
|---|---|
| Glucose syrup | about 40 |
| Neutral soap | do 1 |
| Sodium benzoate | do 1 |
| Inert diluent (such as water) | do 58 |

Experience indicates that a composition so prepared has a viscosity suitable for use in ordinary spraying apparatus. The composition when applied to the surface of foliage produces a substantially film-like coating which if desired can be readily removed by washing the water.

It is notable that the film produced on the vegetation by spraying with the composition hereinbefore described is characterized by exerting substantial constricting and crushing action upon insects already feeding upon the vegetation as well as upon insects subsequently alighting or crawling thereon. It has been found that when the insect encounters this film, it becomes primarily concerned with disentangling itself and thereby overcomes tendencies to feed or deposit eggs. It will be apparent, therefore, that not only is the adult female killed but deposition of eggs for the next generation is in a large measure prevented. Oviposition is further deterred by the presence of the film which tends to entangle and hinder the ovipositor where eggs have already been laid, or where larvae are about to hatch, the presence of the film tends to prevent proper germination of the eggs or emergence of the larva, and the larva, furthermore, if it emerges, encounters the film, and is unable to feed upon the vegetation thereby being in turn destroyed. It will be apparent, moreover, that these conditions will arise only in the event that the material does not destroy the eggs before hatching of the larva. However, inasmuch as the eggs are normally destroyed prior to hatching, it will be apparent that under no conditions will the insects be unaffected by the spraying of the composition upon the foliage.

What is claimed is:

A parasiticidal liquid miscible in at least most proportions with water and adapted to being distributed by a spray apparatus and the like comprising a diluted mixture of about 40% by weight of a saturated aliphatic normally viscid water miscible organic substance selected from the class consisting of glucose, malt syrup and glycerol, and about 1% by weight of a substantially neutral soap-like substance for diminishing the surface tension of the composition.

HENRY J. REYNOLDS.